United States Patent [19]
Surutzidis et al.

[11] Patent Number: 5,830,841
[45] Date of Patent: Nov. 3, 1998

[54] SUDS CONTROLLING COMPOSITIONS COMPRISING SILICONE AND SILICA

[75] Inventors: Athanasios Surutzidis, Wemmel; Roger Jeffery Jones, Jauche, both of Belgium

[73] Assignee: The Procter & Gamble Company, Cincinnati, Ohio

[21] Appl. No.: 759,847

[22] Filed: Dec. 2, 1996

Related U.S. Application Data

[63] Continuation of Ser. No. 351,269, Feb. 14, 1995, abandoned, continuation of PCT/US93/04924 May 25, 1993.

[30] Foreign Application Priority Data

Jun. 6, 1992 [WO] WIPO ............................. 92201649.8

[51] Int. Cl.$^6$ ........................................................ C11D 3/08
[52] U.S. Cl. ........................ 510/438; 510/441; 510/466; 252/321; 252/358
[58] Field of Search ..................................... 252/321, 358; 510/466, 438, 441

[56] References Cited

U.S. PATENT DOCUMENTS

| | | | |
|---|---|---|---|
| 4,400,288 | 8/1983 | Dhanani et al. | 252/135 |
| 4,451,387 | 5/1984 | Tai | 252/174.15 |
| 4,652,392 | 3/1987 | Baginski et al. | 252/109 |
| 4,732,694 | 3/1988 | Goulans | 252/174.21 |
| 4,798,679 | 1/1989 | Castro et al. | 252/174.15 |
| 4,978,471 | 12/1990 | Starch | 252/174.15 |
| 4,983,316 | 1/1991 | Starch | 252/174.15 |
| 5,045,225 | 9/1991 | Aronson et al. | 252/174.15 |
| 5,494,600 | 2/1996 | Surutzidis et al. | 252/91 |

*Primary Examiner*—Kery A. Fries
*Attorney, Agent, or Firm*—Ken K. Patel; Kim W. Zerby; Jacobus C. Rasser

[57] ABSTRACT

A process for preparing a suds controlling composition suitable for incorporation into laundry detergent products comprises absorbing into the pores of porous silica a sufficient amount of a surfactant-containing solution to ensure wetting of the porous silica, dispersing the porous silica having the surfactant-containing solution absorbed therein in a silicone oil and mixing the dispersion with a dispersing agent.

1 Claim, No Drawings

SUDS CONTROLLING COMPOSITIONS COMPRISING SILICONE AND SILICA

This is a continuation of application Ser. No. 08/351,269, filed on Feb. 14, 1995, now abandoned, which is a continuaton of PCT/US93/04924 May 25, 1993.

TECHNICAL FIELD

The present invention relates to suds controlling compositions and stable liquid detergent compositions containing them.

BACKGROUND

It has become common practice in the detergent industry to include in detergent compositions materials which are intended to control the amount of foam produced during a washing cycle in a washing machine.

Silicone oil and hydrophobic silica mixtures in finely dispersed form have been found to be particularly effective antifoam agents, and efforts have been directed towards increasing the stability of such agents upon prolonged storage in liquid detergent compositions containing them.

However, it has found to be difficult to create and maintain the finely dispersed form of said antifoam agents in liquid detergent compositions, especially in a high ionic strength medium.

In U.S. Pat. No. 4,798,679, it has been proposed to make a premix of dispersing agents and suds controlling agents to obtain storage benefits.

Surprisingly, it has now been found that improved storage stability of silicone oil/silica antifoam agents in liquid detergent compositions can be achieved by absorbing a surfactant into the pores of the silica prior to the mixing with the silicone oil.

According to the present invention, a suds controlling composition is provided which has improved stability upon storage when incorporated into liquid detergents.

According to another embodiment of the present invention, a stable liquid detergent composition comprising said suds controlling composition is provided.

According to still another embodiment of the present invention, a process is provided to obtain stable liquid detergent compositions comprising the suds controlling composition of the present invention.

SUMMARY OF THE INVENTION

The present invention provides suds controlling composition for inclusion in a detergent composition in liquid form, comprising a silicone oil/ silica antifoam agent and a dispersant characterised in that the silica is absorbed with a surfactant-containing solution.

The present invention also provides liquid detergent compositions comprising said suds controlling composition, surface-active agents and optionally other detergent ingredients.

DETAILED DESCRIPTION OF THE INVENTION

The silicone oil/silica antifoam agent

The silicone oil/silica antifoam agent according to the present invention comprises a mixture of a silicone oil and solid silica.

In industrial practice, the term "silicone" has become a generic term which encompasses a variety of relatively high-molecular-weight polymers containing siloxane units and hydrocarbyl groups of various types. Generally, the silicone oil can be described as siloxanes having the general structure:

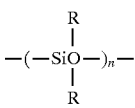

wherein n is from 20 to 2.000, and where each R independently can be an alkyl or an aryl radical. Examples of such substituents are methyl, ethyl, propyl, isobutyl, and phenyl. Preferred polydiorganosiloxanes are polydimethylsiloxanes having trimethylsilyl endblocking units and having a viscosity at 25° C. of from $5 \times 10^{-5}$ m$^2$/s to 0.1 m$^2$/s i.e. a value of n in the range 40 to 1500. These are preferred because of their ready availability and their relatively low cost.

Other suitable silicone oils that can be used for the present invention are functional silicone oils. Preferred functional silicone oils are anionic or cationic type of silicone oils.

The solid silica can be a fumed silica, a precipitated silica or a silica made by the gelformation technique. The silica particles can be rendered hyrophobic by treating them with diaklylsilane groups and/or trialkylsilane groups either bonded directly onto the silica or by means of silicone resin. A preferred silica comprises a hydrophobic silanated, most preferably trimethylsilanated silica having a particle size in the range from 10 nanometer to 20 nanometer and a specific surface area above 50 m$^2$/g.

The silica is further characterized by a high absorption value. The absorption can be expressed as Dibutylphtalate (DBP) number.

Porous silica suitable for the present invention is available under the trade name Sipernat® from Degussa.

The silicone oil/silica antifoam agents employed in the suds controlling composition suitable for the present invention have an amount of silica in the range of 1 to 30%, more preferably from 1 to 20% by weight of the total weight of the silicone oil.

The silicone oil/silica antifoam agents, as described hereinabove, must be present in the liquid detergent compositions in finely dispersed form in order to be effective. However, the particles of said antifoam agent present in the liquid detergent composition tend to coagulate upon storage.

According to the present invention, it has been found that improved stability of the silicone oil/silica antifoam agent can be achieved by absorbing a surfactant containing solution into the porous silica prior to mixing with the silicone oil.

The concept of "stability" as used herein is in the context of maintaining the silicone oil/silica antifoam agent in finely dispersed form.

The absorption of a surfactant-containing solution reduces the coalescence of the silicone oil/silica antifoam particles so that stable detergent formulas can be prepared. The surfactant-containing solution comprises a surfactant selected from an anionic, nonionic, ampholytic or zwitterionic surfactant. Preferably, the surfactant-containing solution comprises a nonionic surfactant. A wide range of nonionic surfactants can be used.

Suitable nonionic surfactants are condensates of ethylene oxide with a hydrophobic moiety to provide a surfactant having a hydrophillic-lipophillic balance (HLB) in the range from 8 to 17, preferably from 9.5 to 13.5, more preferably from 10 to 12.5.

Especially preferred nonionic surfactants of this type are the $C_9$–$C_{15}$ primary alcohol ethoxylates containing 3–8 moles of ethylene oxide per mole of alcohol, particularly the $C_{14}$–$C_{15}$ primary alcohols containing 6–8 moles of ethylene oxide per mole of alcohol and the $C_{12}$–$C_{14}$ primary alcohols containing 3–5 moles of ethylene oxide per mole of alcohol.

The surfactants present in the surfactant-containing solution should be present at levels sufficiently high to ensure the wetting of the silica.

At high levels of surfactant, agglomerates can be formed. Preferably, the level of surfactant that can be used should be such to maintain a free flowing powder.

As an example, the level of ethoxylated fatty alcohols with an HLB-value in the range of 9 to 13 is present from 3 to 4.5% by weight of the porous silica. Preferably, the silica/silicone mixture further comprises ultra-fine particles, said particles having average particle sizes less than 0.1 micron. Preferred particles to be added are silica particles. A preferred silica is fumed nonporous silica. An example of such silica is available under the trade name Aerosil R972 ex Degussa.

Dispersant

The suds contolling composition of the present invention comprises a dispersing agent.

The dispersing agent disperses or helps disperse the silicone suds control agent uniformly so that stable, preferably homogeneous, detergent formulas can be prepared. The dispersing agent is premixed with the antifoam agent prior to incorporation into the liquid detergent composition.

Suitable dispersing agents include materials such as ethylene oxide adducts of linear or arylphenols having from 8 to 20 carbon atoms per molecule, such as lauryl polyoxethylene glycol ether, stearyl polyoxyethylene, glycol ether, cetyl polyoxyethylene glycol ether, and nonylphenol polyoxyethylene glycol ether, and also ethylene oxide adducts of linear or branched monocarboxylic acids and having HLBs of greater than about 13.5, preferably greater than about 14. Preferably, such addition products have short hydrophylic chains containing 12 or preferably less carbon atoms and from about 8 to about 15 ethylene oxide units per molecule. Other examples of preferred dispersants are polyoxyethylene glycol sorbitan esters of polyoxyethylene glycol sorbital esters having HLB values of 14 or more, such as polyoxyethylene glycol sorbitan hexaoleate or polyoxyethylene sorbitol hexaoleate. Additional examples of preferred dispersants are fatty acid nono-,di-, and/or polyglycerides and sodium or calcium stearoyl lactate, diglycerol stearate, and sorbitan monostearate. The anti-foam agnet of the present invention can contain a single type of dispersant or mixtures of at least two different types of dispersants.

Other useful dispersants are commercial oxyethylated polyhydric alcohols or their derivatives or similar compounds having an active hydrogen atom, as well as fatty acid esters of glycerol or sorbitol.

Anionic emulsifiers, such as sodium dodecylbenzenesulphonate or sodium laurylsulphate, can also be used, but preferably with a solvent.

Preferred is an emulsifier mixture of oxyethylated fatty alcohol and oxyethylated triglyceride having an HLB value preferably in the range from about 14 to 16.

The preferred solvent for dimethylpolysiloxane is tetrameric or pentameric cyclomethicone. Particularly preferred dispersants for use herein are cyclomethicone and C9–C11 linear chain alcohols ethoxylated with from about 7 to about 10 moles of ethylene oxide per mole of alcohol especially when the unreacted alcohol and monoethoxylated alcohol are removed and mixtures thereof. Most preferred dispersants are silicone glycol copolymers, optionally in combination with cyclomethicone compounds. Examples of said mixtures which are commercially available are DC3225C manufactured by Dow Corning. The weight ratio of dispersant to silica/silicone antifoam agent is preferably from 1:100 to 1:1, more preferably from 1:10 to 1:2.

The carrier material

Optionally, the suds controlling composition of the present invention comprise the silicone oil/silica anti-foam agent in the form of a dispersion in a water-soluble or water-dispersable organic carrier for incorporation into a detergent composition.

Suitable organic carriers are nonionic surfactants. Preferably, the nonionic surfactants are ethoxylated surfactants. In general, ethoxylated nonionic surfactants suitable herein have an average ethyleneoxy content in the range from 35% to 70% and especially from 50% to 62.5% by weight of the surfactant.

Examples of suitable nonionic surfactants include the condensation products of primary or secondary aliphatic alcohols having from 8 to 24 carbon atoms, in either straight chain or branched chain configuration, with from 2 to 18 moles of alkylene oxide per mole of alcohol. Preferably, the aliphatic alcohol comprises between 9 and 15 carbon atoms and is ethoxylated with between 2 and 9, desirably between 3 and 8 moles of ethylene oxide per mole of aliphatic alcohol. Most preferred are alkoxylated nonionic surfactants having an average HLB in the range from 9.5 to 13.5, especially 10 to 12.5. Highly suitable nonionic surfactants of this type are ethoxylated primary C9–15 alcohols having an average degree of ethoxylation from 2 to 9, more preferably from 3 to 8.

In terms of processing, the compounds of the suds controlling composition are premixed before incorporation into the liquid detergent composition. The suds controlling composition of the present invention is made by absorbing the surfactant into the pores of the silica which is then dispersed in the silicone oil. The silicone oil dispersion can be mixed with the dispersant in a high shear mixer. The high shear mix can be prepared using any conventional high shear mixing equipment.

The suds controlling composition of the present invention can also be incorporated in detergent additive products. Such additive products are intended to supplement or boost the performance of conventional detergent compositions and may contain any of the components of such compositions.

The liquid detergent compositions comprising the suds controlling composition of the present invention is made by mixing the suds controlling composition together with detergent ingredients.

A variant of this process comprises a premix of the suds controlling composition with a carrier material. The premix is then mixed with the other detergent ingredients.

The liquid detergent compositions comprising the suds controlling composition can be provided having various ratios and proportions of the detergent ingredients.

The amount of suds controlling composition in the liquid detergent composition can be varied, depending upon the suds profile desired by the formulation. The level of the suds controlling composition is preferably present from 0.8% to 3.0% by weight of the total detergent composition.

Detergent ingredients

In another embodiment of the present invention, a liquid detergent composition is provided comprising the suds controlling composition of the present invention mixed with detergent ingredients. Detergent ingredients include surfactants, builders and optional detergent additives. A wide range of surfactants can be used in the detergent composition of the present invention.

A typical listing of anionic, nonionic, ampholytic and zwitterionic classes, and species of these surfactants, is given in U.S. Pat. No. 3,664,961 issued to Norris on May 23, 1972.

Mixtures of anionic surfactants are particularly suitable herein, especially mixtures of sulphonate and sulphate surfactants in a weight ratio of from 5:1 to 1:2, preferably from 3:1 to 2:3, more preferably from 3:1 to 1:1. Preferred sulphonates include alkyl benzene sulphonates having from 9 to 15, especially 11 to 13 carbon atoms in the alkyl radical, and alpha-sulphonated methyl fatty acid esters in which the fatty acid is derived from a $C_{12}$–$C_{18}$ fatty source preferably from a $C_{16}$–$C_{18}$ fatty source. In each instance the cation is an alkali metal, preferably sodium. Preferred sulphate surfactants are alkyl sulphates having from 12 to 18 carbon atoms in the alkyl radical, optionally in admixture with ethoxy sulphates having from 10 to 20, preferably 10 to 16 carbon atoms in the alkyl radical and an average degree of ethoxylation of 1 to 6. Examples of preferred alkyl sulphates herein are tallow alkyl sulphate, coconut alkyl sulphate, and $C_{14-15}$ alkyl sulphates. The cation in each instance is again an alkali metal cation, preferably sodium.

One class of nonionic surfactants useful in the present invention are condensates of ethylene oxide with a hydrophobic moiety to provide a surfactant having an average hydrophilic-lipophilic balance (HLB) in the range from 8 to 17, preferably from 9.5 to 13.5, more preferably from 10 to 12.5. The hydrophobic (lipophilic) moiety may be aliphatic or aromatic in nature and the length of the polyoxyethylene group which is condensed with any particular hydrophobic group can be readily adjusted to yield a water-soluble compound having the desired degree of balance between hydrophilic and hydrophobic elements.

Especially preferred nonionic surfactants of this type are the $C_9$–$C_{15}$ primary alcohol ethoxylates containing 3–8 moles of ethylene oxide per mole of alcohol, particularly the $C_{14}$–C15 primary alcohols containing 6–8 moles of ethylene oxide per mole of alcohol and the $C_{12}$–$C_{14}$ primary alcohols containing 3–5 moles of ethylene oxide per mole of alcohol.

Another class of nonionic surfactants comprises alkyl polyglucoside compounds of general formula

wherein Z is a moiety derived from glucose; R is a saturated hydrophobic alkyl group that contains from 12 to 18 carbon atoms; t is from 0 to 10 and n is 2 or 3; x is from 1.3 to 4, the compounds including less than 10% unreacted fatty alcohol and less than 50% short chain alkyl polyglucosides. Compounds of this type and their use in detergent are disclosed in EP-B 0 070 077, 0 075 996 and 0 094 118.

Also suitable as nonionic surfactants are poly hydroxy fatty acid amide surfactants of the formula

wherein $R^1$ is H, or $R^1$ is $C_{1-4}$ hydrocarbyl, 2-hydroxy ethyl, 2-hydroxy propyl or a mixture thereof, $R^2$ is $C_{5-31}$ hydrocarbyl, and Z is a polyhydroxyhydrocarbyl having a linear hydrocarbyl chain with at least 3 hydroxyls directly connected to the chain, or an alkoxylated derivative thereof. Preferably, $R^1$ is methyl, $R^2$ is a straight $C_{11-15}$ alkyl or alkenyl chain such as coconut alkyl or mixtures thereof, and Z is derived from a reducing sugar such as glucose, fructose, maltose, lactose, in a reductive amination reaction.

The compositions according to the present invention may further comprise a builder system. Any conventional builder system is suitable for use herein including aluminosilicate materials, silicates, polycarboxylates and fatty acids, materials such as ethylenediamine tetraacetate, metal ion sequestrants such as aminopolyphosphonates, particularly ethylenediamine tetramethylene phosphonic acid and diethylene triamine pentamethylenephosphonic acid. Though less preferred for obvious environmental reasons, phosphate builders can also be used herein. Suitable builders can be an inorganic ion exchange material, commonly an inorganic hydrated aluminosilicate material, more particularly a hydrated synthetic zeolite such as hydrated zeolite A, X, B or HS. Another suitable inorganic builder material is layered silicate, e.g. SKS-6 (Hoechst). SKS-6 is a crystalline layered silicate consisting of sodium silicate ($Na_2Si_2O_5$). Suitable polycarboxylates builders for use herein include citric acid, preferably in the form of a water-soluble salt, derivatives of succinic acid of the formula R—CH(COOH)CH2(COOH) wherein R is C10–20 alkyl or alkenyl, preferably C12–16, or wherein R can be substituted with hydroxyl, sulfo sulfoxyl or sulfone substituents. Specific examples include lauryl succinate , myristyl succinate, palmityl succinate2-dodecenylsuccinate, 2-tetradecenyl succinate. Succinate builders are preferably used in the form of their water-soluble salts, including sodium, potassium, ammonium and alkanolammonium salts. Other suitable polycarboxylates are oxodisuccinates and mixtures of tartrate monosuccinic and tartrate disuccinic acid such as described in U.S. Pat. No. 4,663,071. Especially suitable fatty acid builders for use herein are saturated or unsaturated C10–18 fatty acids, as well as the corresponding soaps. Preferred saturated species have from 12 to 16 carbon atoms in the alkyl chain. The preferred unsaturated fatty acid is oleic acid. Another preferred builder system for liquid compositions is based on dodecenyl succinic acid. Other suitable water-soluble organic salts are the homo- or co-polymeric acids or their salts, in which the polycarboxylic acid comprises at least two carboxyl radicals separated from each other by not more than two carbon atoms. Polymers of this type are disclosed in GB-A-1,596,756. Examples of such salts are polyacrylates of MW 2000–5000 and their copolymers with maleic anhydride, such copolymers having a molecular weight of from 20,000 to 70,000, especially about 40,000.

Detergency builder salts are normally included in amounts of from 10% to 80% by weight of the composition preferably from 20% to 70% and most usually from 30% to 60% by weight.

Other components used in detergent compositions may be employed, such enzymes and stabilizers or activators therefore, soil-suspending agents soil-release agents, optical brighteners, abrasives, bactericides, tarnish inhibitors, coloring agents, and perfumes.

The liquid compositions according to the present invention can also be in "compact form", in such case, the liquid detergent compositions according to the present invention will contain a lower amount of water, compared to conventional liquid detergents.

Test procedure

To assess the stabilizing effect of the surfactant being absorbed into the silica of the suds controlling compositions incorporated in liquid detergent, compositions are compared in the absence and presence of said surfactant. More in particular, the stability of polydimethyl siloxane/silica was determined in the absence and in the presence of nonionic surfactant solution. The stability of the samples were measured after several periods of storage at 21° C. The stability was determined by visual inspection of the samples assessing the flocculation of the silica/silicone particles:

The following examples are meant to exemplify compositions of the present inventions, but are not necessarily meant to limit the scope of the invention.

Example I:

1. Non-ionic surfactant (alkyl alcohol ethylene oxide condensate with an average of 7 ethoxylate units and an alkyl chain length of 13 to 15 carbon.) is added at approximately 3% by weight in a water/propylene glycol solution. (60:40 water:propylene glycol).
2. The surfactant containing solution is then combined with porous hydrophobic silica (currently used Sipernat D10 ex Degussa) at ratio 1:1 up to 2.5:1 times the silica's weight (corresponding to the silica's total pore volume). The solution is added in a dropwise manner under mild stirring 1000 rpms to aid the production of a homogeneously filled silica. At this stage the product is still in powder form. A variant of this step includes the addition of 5% of hydrophobic silica Aerosil R972 ex Degussa after the surfactant absorption has occured.
3. This powder is subsequently dispersed in silicone oil (polydimethylsiloxane). We have currently experimented with silicone oils with viscosities of 500, 1000, 5000, 125000 and 30000 cs. Dispersion occurs under continuous stirring with a propeller mixer at 1600 to 1850 rpm for about 3 minutes.
4. The silicone oil dispersion is finally emulsified in the detergent matrix by techniques known in art.

Example II

A liquid detergent composition according to the present invention is prepared, having the following compositions:

| % by weight of the total detergent composition | | |
|---|---|---|
| | I | II |
| Linear alkylbenzene sulfonate | 10 | 15 |
| Alkyl sulphate | 4 | |
| Fatty alcohol ($C_{12}$–$C_{15}$) ethoxylate | 9 | 14 |
| Fatty acid | 5 | 10 |
| Oleic acid | 4 | |
| Citric acid | 5 | 9 |
| KOH | | 3 |
| NaOH | 5.4 | |
| Monoethanolamine | | 9 |
| Propanediol | 1.5 | 9 |
| Ethanol | 5 | 1 |
| Minors | up to 100 | |

The above compositions I and II were each supplemented by the suds controlling compositions A and B (Table I). The components of the suds controlling composition were premixed before being added to the liquid detergent compositions. The stability of the samples IA, IB, IIA, IIB were determined after several weeks of storage at 21° C.

TABLE I

| | Percentage by weight of the total detergent composition | |
|---|---|---|
| Ingredients | A | B |
| Polydimethyl siloxane/silica | 0.2 | 0 |
| Dispersant | 0.07 | 0.07 |
| Nonionic | 1.8 | 1.8 |
| Polydimethyl siloxane/silica* | 0 | 0.2 |

*Polydimethyl siloxane/fumed silica according to example I.

Results:

| | IA | IB |
|---|---|---|
| Fresh | -homogeneously dispersed | -homogeneously dispersed |
| 1wk | -homogeneously dispersed | -homogeneously dispersed |
| 3wk | -flocculation | -homogeneously dispersed |
| 6wk | -increased flocculation | -homogeneously dispersed |
| | IIA | IIB |
| Fresh | -homogeneously dispersed | -homogeneously dispersed |
| 1wk | -homogeneously dispersed | -homogeneously dispersed translucent |
| 3wk | -flocculation | -homogeneously dispersed |
| 6wk | -increased flocculation | -homogeneously dispersed |

As can be seen from the results, the absorption of a surfactant into the silica greatly improves the stability of the finely dispersed silica/silicone antifoam agent in the liquid detergent composition.

What is claimed is:

1. A process for preparing a suds controlling composition suitable for incorporation into liquid laundry detergent products wherein the said composition comprises;

a) a silicone oil/porous silica antifoam agent, wherein the porous silica is present in an amount of from 1% to 30% by weight of the silicone oil antifoam agent, b) a dispersing agent which is present in a weight ratio of dispersing agent to antifoam agent of from 1:100 to 1:1, the said process comprising the steps of;

1) absorbing into the pores of said porous silica a sufficient amount of a surfactant-containing solution to ensure wetting of the said porous silica, 2) dispersing the porous silica of Step 2) in the silicone oil, and 3) mixing the dispersion of Step 2) with the dispersant.

* * * * *